(12) United States Patent
Kido (10) Patent No.: US 6,947,745 B1
(45) Date of Patent: Sep. 20, 2005

(54) SYSTEM, METHOD AND RECORD MEDIUM FOR MOBILE RADIO COMMUNICATION EMPLOYING LOCATION-LIMITED MOBILE STATIONS

(75) Inventor: Masaaki Kido, Tokyo (JP)

(73) Assignee: NEC Corporation, Tokyo (JP)

(*) Notice: Subject to any disclaimer, the term of this patent is extended or adjusted under 35 U.S.C. 154(b) by 510 days.

(21) Appl. No.: 09/649,133

(22) Filed: Aug. 28, 2000

(30) Foreign Application Priority Data

Aug. 26, 1999 (JP) .................................. 11-239504

(51) Int. Cl.$^7$ ............................................. H04Q 7/38
(52) U.S. Cl. ............................... 455/435.1; 455/432.1; 455/433; 455/456.1
(58) Field of Search ................................ 455/421, 432, 455/433, 435, 525, 435.1, 456.4, 426.2, 435.2, 455/456.1, 458, 517, 432.1, 456.3, 422.1, 455/445, 456.6

(56) References Cited

U.S. PATENT DOCUMENTS

| | | | | |
|---|---|---|---|---|
| 5,379,451 A | * | 1/1995 | Nakagoshi et al. | ...... 455/435.1 |
| 5,475,735 A | * | 12/1995 | Williams et al. | ............ 455/403 |
| 5,946,632 A | * | 8/1999 | Yi et al. | ..................... 455/525 |
| 6,223,038 B1 | * | 4/2001 | Iseyama et al. | .......... 455/435.3 |
| 6,263,201 B1 | * | 7/2001 | Hashimoto et al. | ......... 455/403 |
| 6,510,318 B1 | * | 1/2003 | Minagawa | ............... 455/435.2 |

FOREIGN PATENT DOCUMENTS

| | | | | |
|---|---|---|---|---|
| JP | A 8-98247 | 4/1996 | | |
| JP | A 9-322261 | 12/1997 | | |
| JP | 10-23498 | 1/1998 | | |
| JP | 10-200938 | 7/1998 | | |
| WO | WO 96/34500 | * 10/1996 | ............ | H04Q 7/20 |
| WO | WO 9634500 | 10/1996 | | |
| WO | WO 99/03293 | * 1/1999 | ............ | H04Q 7/38 |
| WO | WO 9903293 | 1/1999 | | |

* cited by examiner

*Primary Examiner*—William Trost
*Assistant Examiner*—Brandon J. Miller
(74) *Attorney, Agent, or Firm*—Young & Thompson

(57) ABSTRACT

The use (call origination, call reception and/or communication (handoff)) of a CDMA-WLL (Wireless Local Loop) mobile station (location-limited mobile station) outside its registered areas is functionally prohibited. The registered areas are determined with regard to each CDMA-WLL mobile station and information concerning the registered areas is stored in a CDMA-WLL controller. For example, when a CDMA-WLL mobile station originated a call, a mobile services switching center refers to the CDMA-WLL controller and thereby searches for the registered areas of the CDMA-WLL mobile station, compares the registered areas with present location areas of the CDMA-WLL mobile station, and executes a connection establishment process for the CDMA-WLL mobile station if a match occurred in the comparison. By such functional location limitation of the CDMA-WLL mobile station, the differentiation between the CDMA-WLL mobile stations and ordinary (location-unlimited) mobile stations can be made properly, and the balance between the CDMA-WLL mobile stations and fixed (wired) telephone sets can be maintained appropriately.

6 Claims, 9 Drawing Sheets

| CDMA-WLL TERMINAL | BASIC REGISTERED AREAS | EXTENDED REGISTERED AREAS | ALTERNATIVE REGISTERED AREAS |
|---|---|---|---|
| 32₁ | 12₂,13₃,17₁,13₂* | CITY A | — |
| 32₂ | 13₂,16₁,15₃,15₁* | — | (MAY 1~20) 201₁,202₃ |
| 32₃ | 13₁,14₃,15₁,13₃* | — | — |
| ⋮ | ⋮ | ⋮ | ⋮ |

SYSTEM, METHOD AND RECORD MEDIUM FOR MOBILE RADIO COMMUNICATION EMPLOYING LOCATION-LIMITED MOBILE STATIONS

BACKGROUND OF THE INVENTION

The present invention relates to a mobile radio communication system and a mobile radio communication method in which information is communicated between mobile stations and base transceiver stations (radio base stations), and in particular, to a mobile radio communication system and a mobile radio communication method by which the balance between a location-limited mobile station (that is, a mobile station which is supposed to be used in a limited and fixed area) and an ordinary mobile station (that is, a mobile station which is supposed to be carried around freely) can be maintained appropriately.

DESCRIPTION OF THE PRIOR ART

Mobile stations such as portable cellular phones and PHS (Personal Handy-phone system) phones (or PACS (Personal Access Communications Service) phones) have become widespread, and mobile radio communication systems are rapidly becoming prevalent all around the world. In a mobile radio communication system, a service area of a telecommunications carrier is divided into a plurality of coverage areas (radio transmission/reception areas) and each coverage area is provided with a base transceiver station (radio base station) for communicating with mobile stations by use of radio signals.

Figure 1:
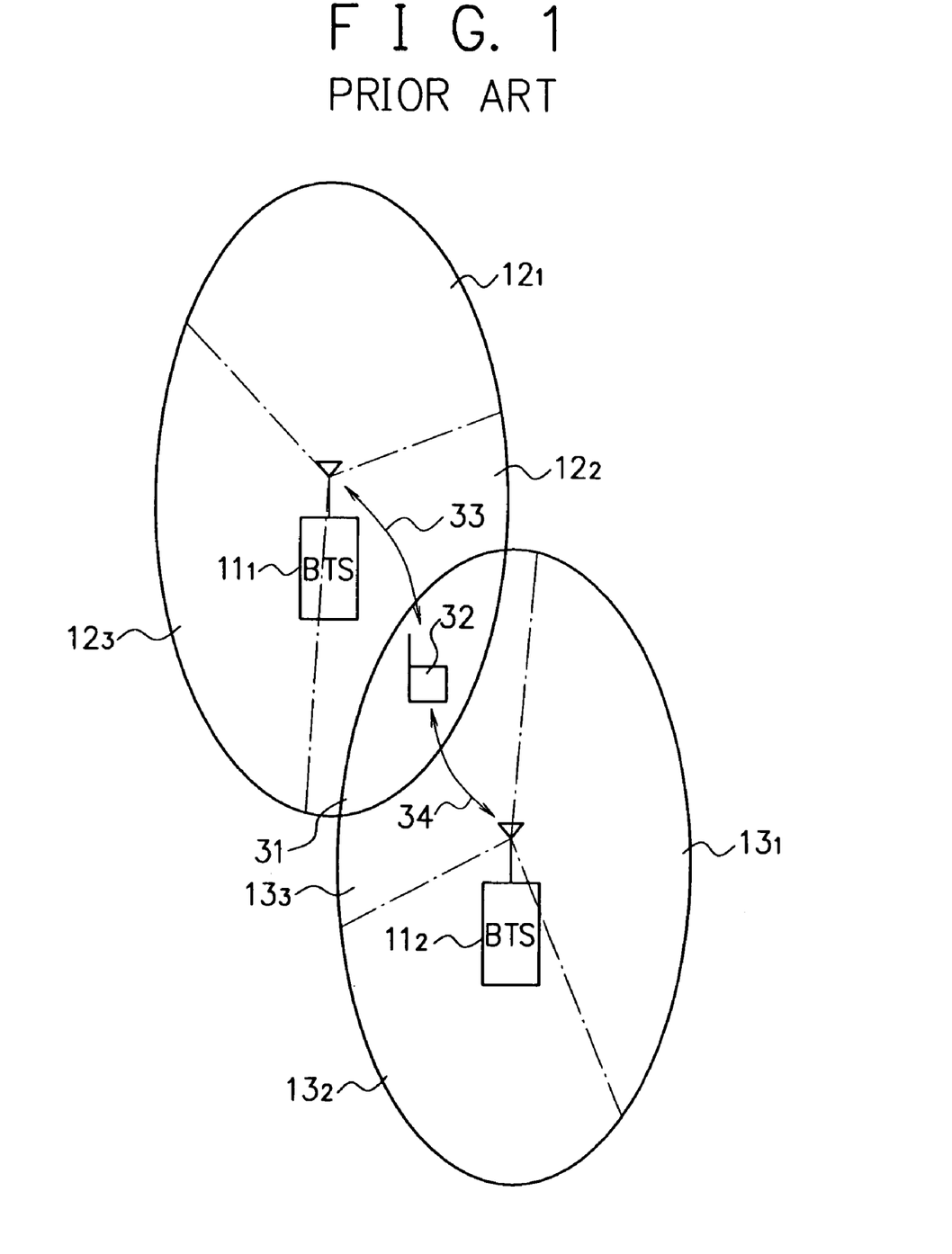
FIG. 1 is a schematic diagram showing an example of coverage areas, in which two base transceiver stations and their coverage areas are shown.

FIG. 1 is a schematic diagram showing an example of the coverage areas, in which two base transceiver stations and their coverage areas are shown. In the example, a first base transceiver station $11_1$ covers coverage areas $12_1 \sim 12_3$ and a second base transceiver station $11_2$ covers coverage areas $13_1 \sim 13_3$, in which the coverage areas $12_2$ of the first base transceiver station $11_1$ and the coverage areas $13_3$ of the second base transceiver station $11_2$ overlap each other. Each base transceiver station ($11_1$, $11_2$) is designed to manage two or more (not limited to 3) coverage areas so that the number of CDMA (Code Division Multiple Access) mobile stations which can communicate with the base transceiver station can be increased by dividing into areas.

A limited radio frequency band which is used for the communication between the base transceiver station and the mobile stations has to be shared by a plurality of mobile stations, and thus methods which are called "multiple access" are generally employed, in which each of many stations (mobile stations and base transceiver stations) makes access by selecting an idle air connection (resource). For the mobile radio communication, three methods: FDMA (Frequency division multiple access), TDMA (time division multiple access) and CDMA (Code Division Multiple Access) are employed.

Figure 2:
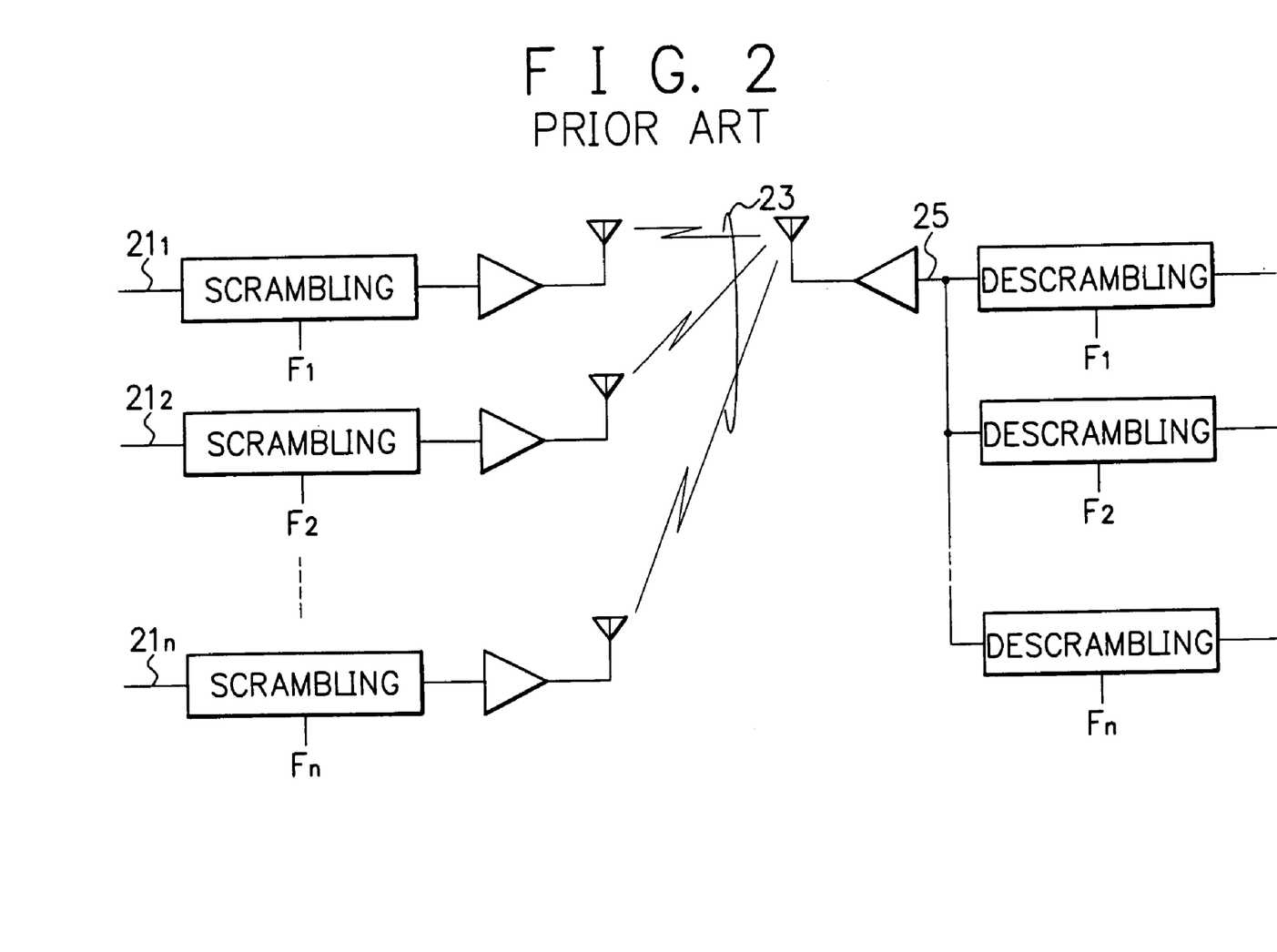
FIG. 2 is a schematic diagram showing the principle of CDMA mobile radio communication.

FIG. 2 is a schematic diagram showing the principle of the CDMA mobile radio communication. Referring to FIG. 2, each signal ($21_1$, $21_2$, ..., $21_n$) to be transmitted by a transmission side is scrambled by use of scrambling code ($F_1$, $F_2$, ..., $F_n$) which is specific to each coverage area and mobile station, amplified by an amplifier, and transmitted as a wide-band signal 23 having a common frequency. On the reception side, a signal 25 received by an antenna and amplified by an amplifier is descrambled by use of the specific scrambling code ($F_1$, $F_2$, ..., $F_n$) and thereby the signals ($21_1$, $21_2$, ..., $21_n$) which are the same as the original signals on the transmission side can be obtained.

Mobile stations according to CDMA can be divided into ordinary CDMA mobile stations (which are supposed to be carried by users freely) and CDMA-WLL (Wireless Local Loop) mobile stations (which are supposed to be used in limited and fixed areas). An application of the WLL system to the PHS (Personal Handy-phone system) has been proposed in Japanese Patent Application Laid-Open No. HEI 10-23498. As for ordinary fixed (wired) telephone sets which are installed in subscriber's premises, connections of the telephone sets are implemented by use of cables such as copper wires and optical fibers, whereas connections of the CDMA-WLL mobile stations are implemented via air connections (radio waves). Therefore, the CDMA-WLL mobile stations are used generally as substitutes for the ordinary telephone sets, in consideration of costs and time necessary for the installation of the ordinary telephone sets by use of wires. Due to such a background, communication charges of the CDMA-WLL mobile stations are set lower than those of the ordinary CDMA mobile stations which are supposed to be carried freely, and almost the same as those of the ordinary telephone sets of fixed networks.

There are cases where the handoff (or hand-over) control is totally prohibited for the CDMA-WLL mobile stations in order to differentiate the CDMA-WLL mobile stations from the ordinary CDMA mobile stations. The handoff control means control for ensuring the continuity of communication by changing the coverage area (or base transceiver station) in charge of the communication when the mobile station moved to another coverage area. In Japanese Patent Application Laid-Open No. HEI 10-200938, a technique for prohibiting the handoff control when the mobile station moved to prohibited areas (concert halls etc.) has been disclosed. Except for such cases, the continuity of communication of the ordinary CDMA mobile station (which is supposed to be carried around freely) is ensured by repeating the handoff control even if the mobile station is carried around in transport facilities etc. On the other hand, in the case of the CDMA-WLL mobile stations which are supposed to be used in limited and fixed areas, the handoff control used to be considered as unnecessary.

However, there are cases where problems occur due to the total prohibition of the handoff control for the CDMA-WLL mobile stations. Such a problem will be explained below referring to FIG. 1, in which the CDMA-WLL mobile station 32 is assumed to be located in the coverage area $12_2$ of the first base transceiver station $_1$ and also in the coverage area $13_3$ of the second base transceiver station $11_2$, that is, in an overlap area 31. If the handoff control is prohibited for the CDMA-WLL mobile station 32 which is communicating with the first base transceiver station $11_1$, the CDMA-WLL mobile station 32 is required to continue communication in the coverage area $12_2$ by use of a path (connection) 33 to the first base transceiver station $11_1$. However, the boundary between the areas tend to move during communication due to change of statuses of radio waves etc., and thus there are cases where communication with the second base transceiver station $11_2$ becomes more preferable than the communication with the first base transceiver station $11_1$. At the worst, the communication might be disconnected unless the communication by use of a path 34 to the second base transceiver station $11_2$ is allowed.

Further, when a large number of mobile stations are communicating in the coverage area $12_2$ of the first base transceiver station $11_1$ and thereby origination restriction for a new mobile station is in operation, the CDMA-WLL mobile station 32 can not start communication by use of the first base transceiver station 11₁ as usual. Also in such cases, the communication can be started if the coverage area 13₃ of the second base transceiver station 11₂ can be used. As explained above, if the coverage area or base transceiver station for the CDMA-WLL mobile station 32 is limited since the CDMA-WLL mobile station 32 is supposed to be used in a limited and fixed area, the possibility of successful communication by the CDMA-WLL mobile station 32 in its authorized coverage area 12₂ becomes lower than that of an ordinary fixed (wired) telephone set.

In order to resolve the above problem, some mobile radio communication systems are going to allow the handoff control for the CDMA-WLL mobile stations. However, if the handoff control is allowed for the CDMA-WLL mobile station which is supposed to be used in a limited and fixed area, the difference between the CDMA-WLL mobile station and the ordinary CDMA mobile station disappears and thereby economic imbalance occurs between the ordinary CDMA mobile stations and the CDMA-WLL mobile stations. Further, the balance between the ordinary wired telephone sets and the CDMA-WLL mobile stations can not be maintained.

While the above explanation has been given taking the CDMA-WLL mobile stations and the ordinary CDMA mobile stations as an example, similar problems generally occur in mobile radio communication systems when the permission/prohibition of the handoff control for mobile stations has to be determined.

SUMMARY OF THE INVENTION

It is therefore the primary object of the present invention to provide a mobile radio communication system and a mobile radio communication method by which a substantial differentiation between location-limited mobile stations (which are supposed to be used in limited and fixed areas) and ordinary mobile stations (which are supposed to be carried around freely) can be made and the appropriate balance between the location-limited mobile stations and ordinary wired (fixed) telephone sets can be maintained.

Another object of the present invention is to provide a mobile radio communication system and a mobile radio communication method in which flexibility of the handoff control for each mobile station can be changed depending on mobility (possibility of movement) etc. of the mobile station.

In accordance with a first aspect of the present invention, there is provided a mobile radio communication system in which location-limited mobile stations can be used, comprising a registered area storage means, a registered area search means, an area comparison means and a connection establishment means. In the registered area storage means, information concerning registered areas, which have been registered as areas where a location-limited mobile station is allowed to originate a call, is stored with regard to each location-limited mobile station. The registered area search means refers to the registered area storage means and thereby searches for the registered areas of a location-limited mobile station when the location-limited mobile station originated a call. The area comparison means compares the registered areas of the location-limited mobile station searched by the registered area search means with present location areas of the location-limited mobile station and thereby judges whether or not a match occurred between the registered areas and the present location areas. The connection establishment means executes a connection establishment process for the location-limited mobile station if a match occurred in the judgment by the area comparison means.

In accordance with a second aspect of the present invention, there is provided a mobile radio communication system in which location-limited mobile stations can be used, comprising a registered area storage means, a present location area tracking means, a registered area search means, an area comparison means and a disconnection means. In the registered area storage means, information concerning registered areas, which have been registered as areas where a location-limited mobile station is allowed to conduct communication, is stored with regard to each location-limited mobile station. The present location area tracking means keeps track of present location areas of a location-limited mobile station when the location-limited mobile station is conducting communication. The registered area search means refers to the registered area storage means and thereby searches for the registered areas of the location-limited mobile station. The area comparison means compares the registered areas of the location-limited mobile station searched by the registered area search means with the present location areas of the location-limited mobile station tracked by the present location area tracking means and thereby judges whether or not a match occurred between the registered areas and the present location areas. The disconnection means disconnects the communication conducted by the location-limited mobile station if no match occurred in the judgment by the area comparison means.

In accordance with a third aspect of the present invention, there is provided a mobile radio communication system in which location-limited mobile stations can be used, comprising a registered area storage means, a registered area search means, an area comparison means and a connection establishment means. In the registered area storage means, information concerning registered areas, which have been registered as areas where a location-limited mobile station is allowed to receive an incoming call, is stored with regard to each location-limited mobile station. The registered area search means refers to the registered area storage means and thereby searches for the registered areas of a location-limited mobile station when an incoming call to the location-limited mobile station occurred. The area comparison means compares the registered areas of the location-limited mobile station searched by the registered area search means with present location areas of the location-limited mobile station and thereby judges whether or not a match occurred between the registered areas and the present location areas. The connection establishment means executes a connection establishment process for the location-limited mobile station if a match occurred in the judgment by the area comparison means.

In accordance with a fourth aspect of the present invention, there is provided a mobile radio communication system in which location-limited mobile stations can be used, comprising a registered area storage means, a registered area search means, a paging means and a connection establishment means. In the registered area storage means, information concerning registered areas, which have been registered as areas where a location-limited mobile station is allowed to receive an incoming call, is stored with regard to each location-limited mobile station. The registered area search means refers to the registered area storage means and thereby searches for the registered areas of a location-limited mobile station when an incoming call to the location-limited mobile station occurred. The paging means lets base transceiver stations corresponding to the registered areas page the location-limited mobile station in the registered areas. The connection establishment means executes a connection establishment process for the location-limited mobile station if the location-limited mobile station made a response to the paging.

In accordance with a fifth aspect of the present invention, there is provided a mobile radio communication system in which location-limited mobile stations can be used, comprising a registered area storage means, a paging means, a registered area search means and a connection establishment means. In the registered area storage means, information concerning registered areas, which have been registered as areas where a location-limited mobile station is allowed to receive an incoming call, is stored with regard to each location-limited mobile station. The paging means lets base transceiver stations page a location-limited mobile station when an incoming call to the location-limited mobile station occurred. The registered area search means refers to the registered area storage means and thereby searches for the registered areas of the location-limited mobile station. The connection establishment means executes a connection establishment process for the location-limited mobile station if the location-limited mobile station made a response to the paging from its registered areas.

In accordance with a sixth aspect of the present invention, in the first through fifth aspects, the registered area storage means is designed so that the registered areas of each location-limited mobile station can be altered so as to change the total area of the registered areas.

In accordance with a seventh aspect of the present invention, in the first through fifth aspects, the registered area storage means is designed so that the registered areas of each location-limited mobile station can be altered to alternative registered areas during a preset period.

In accordance with an eighth aspect of the present invention, there is provided a mobile radio communication method for a mobile radio communication system in which location-limited mobile stations can be used. The mobile radio communication method comprises a registered area search step, an area comparison step and a connection establishment step. In the registered area search step, a registered area storage means, in which information concerning registered areas which have been registered as areas where a location-limited mobile station is allowed to originate a call is stored with regard to each location-limited mobile station, is referred to and thereby the registered areas of a location-limited mobile station is searched for when the location-limited mobile station originated a call. In the area comparison step, the registered areas of the location-limited mobile station searched in the registered area search step are compared with present location areas of the location-limited mobile station and thereby whether or not a match occurred between the registered areas and the present location areas is judged. In the connection establishment step, a connection establishment process is executed for the location-limited mobile station if a match occurred in the area comparison step.

In accordance with a ninth aspect of the present invention, there is provided a mobile radio communication method for a mobile radio communication system in which location-limited mobile stations can be used. The mobile radio communication method comprises a present location area tracking step, a registered area search step, an area comparison step and a disconnection step. In the present location area tracking step, present location areas of a location-limited mobile station are kept track of when the location-limited mobile station is conducting communication. In the registered area search step, a registered area storage means, in which information concerning registered areas which have been registered as areas where a location-limited mobile station is allowed to conduct communication is stored with regard to each location-limited mobile station, is referred to and thereby the registered areas of the location-limited mobile station is searched for. In the area comparison step, the registered areas of the location-limited mobile station searched in the registered area search step are compared with the present location areas of the location-limited mobile station tracked in the present location area tracking step and thereby whether or not a match occurred between the registered areas and the present location areas is judged. In the disconnection step, the communication conducted by the location-limited mobile station is disconnected if no match occurred in the area comparison step.

In accordance with a tenth aspect of the present invention, there is provided a mobile radio communication method for a mobile radio communication system in which location-limited mobile stations can be used. The mobile radio communication method comprises a registered area search step, an area comparison step and a connection establishment step. In the registered area search step, a registered area storage means, in which information concerning registered areas which have been registered as areas where a location-limited mobile station is allowed to receive an incoming call is stored with regard to each location-limited mobile station, is referred to and thereby the registered areas of a location-limited mobile station is searched for when an incoming call to the location-limited mobile station occurred. In the area comparison step, the registered areas of the location-limited mobile station searched in the registered area search step are compared with present location areas of the location-limited mobile station and thereby whether or not a match occurred between the registered areas and the present location areas is judged. In the connection establishment step, a connection establishment process is executed for the location-limited mobile station if a match occurred in the area comparison step.

In accordance with an eleventh aspect of the present invention, there is provided a mobile radio communication method for a mobile radio communication system in which location-limited mobile stations can be used. The mobile radio communication method comprises a registered area search step, a paging step and a connection establishment step. In the registered area search step, a registered area storage means, in which information concerning registered areas which have been registered as areas where a location-limited mobile station is allowed to receive an incoming call is stored with regard to each location-limited mobile station, is referred to and thereby the registered areas of a location-limited mobile station is searched for when an incoming call to the location-limited mobile station occurred. In the paging step, the location-limited mobile station is paged in the registered areas. In the connection establishment step, a connection establishment process is executed for the location-limited mobile station if the location-limited mobile station made a response to the paging.

In accordance with a twelfth aspect of the present invention, there is provided a mobile radio communication method for a mobile radio communication system in which location-limited mobile stations can be used. The mobile radio communication method comprises a paging step, a registered area search step and a connection establishment step. In the paging step, a location-limited mobile station is paged when an incoming call to the location-limited mobile station occurred. In the registered area search step, a registered area storage means, in which information concerning registered areas which have been registered as areas where a location-limited mobile station is allowed to receive an incoming call is stored with regard to each location-limited mobile station, is referred to and thereby the registered areas of the location-limited mobile station is searched for. In the connection establishment step, a connection establishment process is executed for the location-limited mobile station if the location-limited mobile station made a response to the paging from its registered areas.

In accordance with a thirteenth aspect of the present invention, in the eighth through twelfth aspects, the registered areas of each location-limited mobile station are allowed to be altered so as to change the total area of the registered areas.

In accordance with a fourteenth aspect of the present invention, in the eighth through twelfth aspects, the registered areas of each location-limited mobile station are allowed to be altered to alternative registered areas during a preset period.

In accordance with a fifteenth aspect of the present invention, there are provided machine-readable record mediums storing programs for instructing a machine, a computer unit, etc. to execute the mobile radio communication methods of the eighth through fourteenth aspects of the present invention.

BRIEF DESCRIPTION OF THE DRAWINGS

The objects and features of the present invention will become more apparent from the consideration of the following detailed description taken in conjunction with the accompanying drawings, in which.

DESCRIPTION OF THE PREFERRED EMBODIMENTS

Referring now to the drawings, a description will be given in detail of preferred embodiments in accordance with the present invention.

Figure 3:
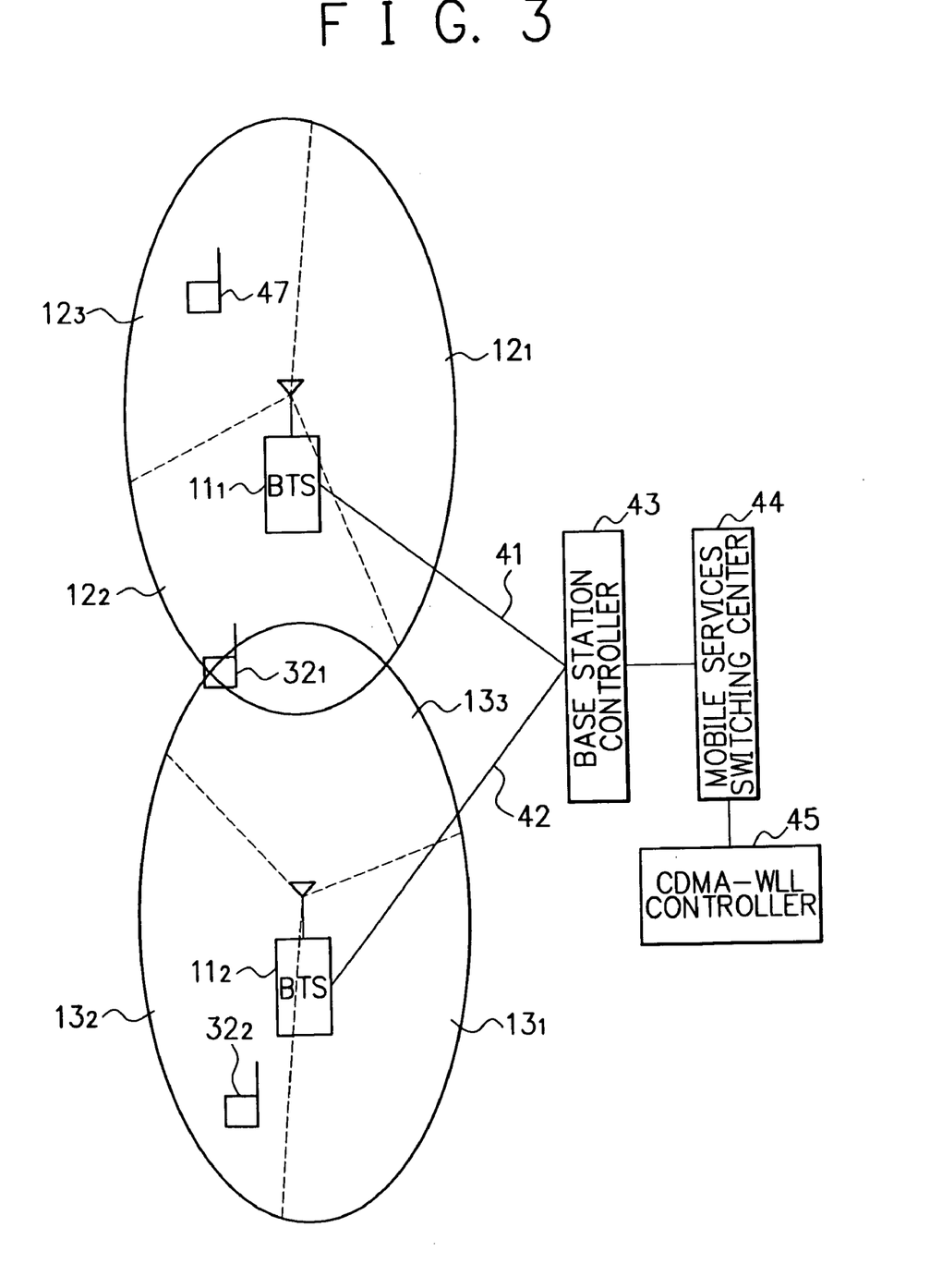
FIG. 3 is a schematic diagram for explaining a mobile radio communication system in accordance with an embodiment of the present invention.

FIG. 3 is a schematic diagram for explaining a mobile radio communication system in accordance with an embodiment of the present invention. In the mobile radio communication system shown in FIG. 3, a first base transceiver station $11_1$ covers coverage areas $12_1$~$12_3$, and a second base transceiver station $11_2$ covers coverage areas $13_1$~$13_3$. The base transceiver stations $11_1$ and $11_2$ are connected to a base station controller (BSC) 43 by communication cables 41 and 42 respectively. The base station controller 43 is connected to a mobile services switching center (MSC) 44, and the mobile services switching center 44 is connected to a CDMA-WLL controller 45. The CDMA-WLL controller 45, which is installed in a home location register (HLR) etc., stores various information concerning CDMA-WLL mobile stations $32_1$, $32_2$, ... and (ordinary) CDMA mobile stations 47 etc., and call connection control for the CDMA-WLL mobile stations is executed based on the information stored in the CDMA-WLL controller 45.

Figure 4:
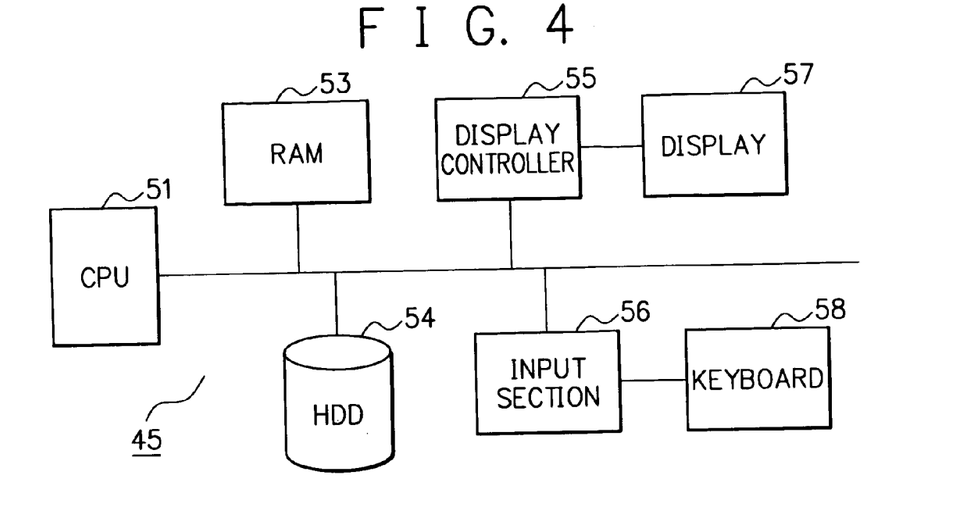
FIG. 4 is a schematic diagram showing an example of the composition of a CDMA-WLL controller of the mobile radio communication system of FIG. 3.

FIG. 4 is a schematic diagram showing an example of the composition of the CDMA-WLL controller 45. The CDMA-WLL controller 45 shown in FIG. 4 includes a CPU (Central Processing Unit) 51, a RAM (Read Only Memory) 53, an HDD (Hard Disk Drive) 54, a display controller 55, a display 57, an input section 56 and a keyboard 58. The CPU 51 is connected to the RAM 53, the HDD 54, the display controller 55 and the input section 56 by a bus 52 (data bus etc.). The display controller 55 controls the display 57 such as an LCD (liquid crystal display) and a CRT (cathode-ray tube) to display various information to the operator. The input section 56 is connected to the keyboard 58 to which instructions, data, etc. are inputted by the operator. The HDD 54 stores programs for controlling the overall operation of the CDMA-WLL controller 45. The programs are copied to the RAM 53 and executed. In the HDD 54, a subscriber information storage area is formed, in which subscriber information with regard to the CDMA-WLL mobile stations $32_1$, $32_2$, ... are successively registered and stored.

Figure 5:
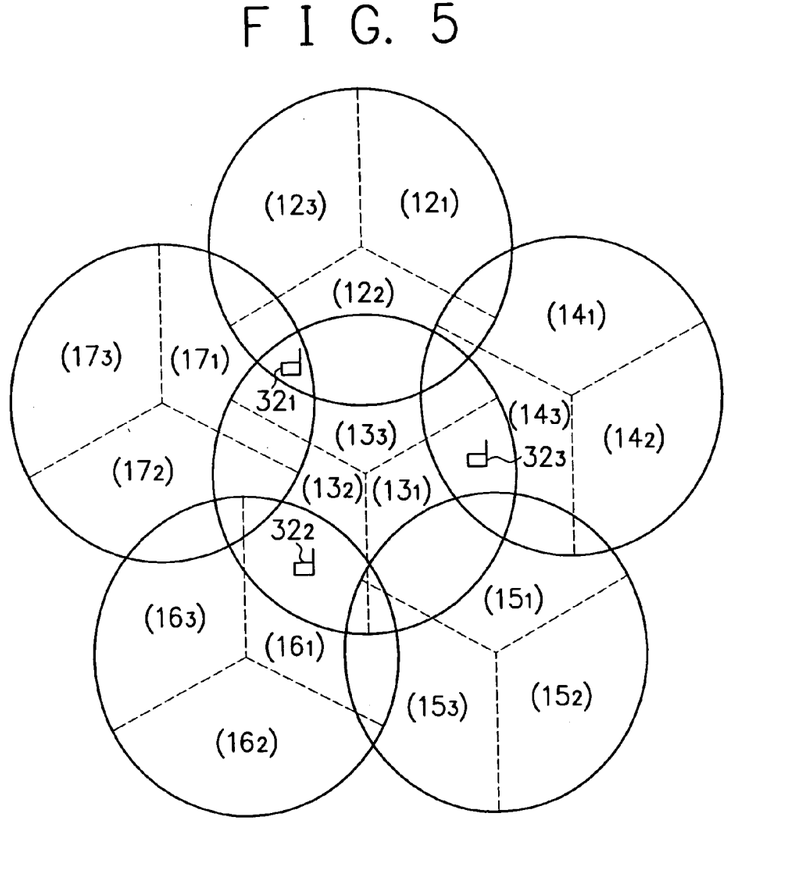
FIG. 5 is a schematic diagram showing an example of coverage areas, in which a larger number of coverage areas than FIG. 3 are shown.
Figure 6:
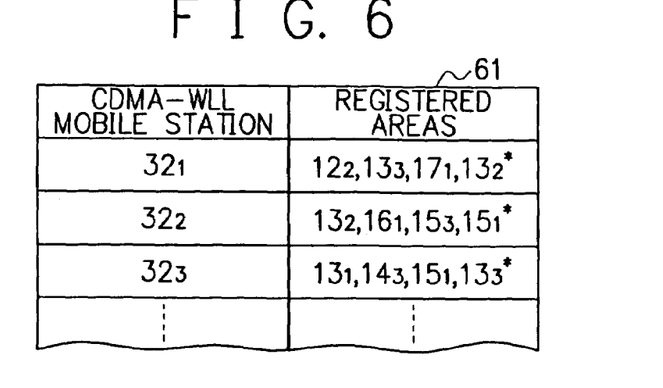
FIG. 6 is a table showing an example of a subscriber information storage area of the CDMA-WLL controller.

FIG. 5 is a schematic diagram showing an example of coverage areas, in which a larger number of coverage areas than FIG. 3 are shown. FIG. 6 is a table showing an example of the subscriber information storage area corresponding to the coverage areas shown in FIG. 5. In FIG. 5, coverage areas $14_1$~$14_3$, $15_1$~$15_3$, $16_1$~$16_3$ and $17_1$~$17_3$ are shown in addition to the coverage areas $12_1$~$12_3$ and $13_1$~$13_3$ shown in FIG. 3.

In the subscriber information storage area 61 shown in FIG. 6, information concerning coverage areas which can be used by each subscriber of each CDMA-WLL mobile station ($32_1$, $32_2$, ... ) is stored (registered). For example, with regard to the CDMA-WLL mobile station $32_1$, overlapping three coverage areas $12_2$, $13_3$ and $17_1$ are registered and stored as the registered areas. By allowing the overlapping three coverage areas $12_2$, $13_3$ and $17_1$, the communication by use of the CDMA-WLL mobile station $32_1$ is ensured even when the origination restriction for a new mobile station is in operation in part of the registered areas due to congestion.

For similar reasons, an adjacent coverage area $13_2$ is added as the registered area for the CDMA-WLL mobile station $32_1$. Even if the CDMA-WLL mobile stations are installed indoors, the boundary of an actual coverage area (in which communication with the base transceiver station can be conducted) moves more or less depending on environmental conditions etc., and the CDMA-WLL mobile station $32_1$ might go out of the boundary depending on its location (horizontal position and height) etc. Therefore, the adjacent coverage area $13_2$ is added as the registered area in order to improve the reliability of communication. Such additional registered areas are also given to other CDMA-WLL mobile stations $32_2$, $32_3$, . . . in the same way. In FIG. 6, such additional registered areas are shown with asterisks (*).

The registration of the registered areas in the subscriber information storage area 61 is conducted one by one by the registration staff (operators of the CDMA-WLL controller 45) when a new CDMA-WLL mobile station 32 is registered, based on location information of the CDMA-WLL mobile station 32 and a coverage area map like the one shown in FIG. 5. It is also possible to prepare a database in which each coverage area is expressed numerically and let the database figure out appropriate registered areas for each CDMA-WLL mobile station 32 based on location information of the CDMA-WLL mobile station 32.

Figure 7:
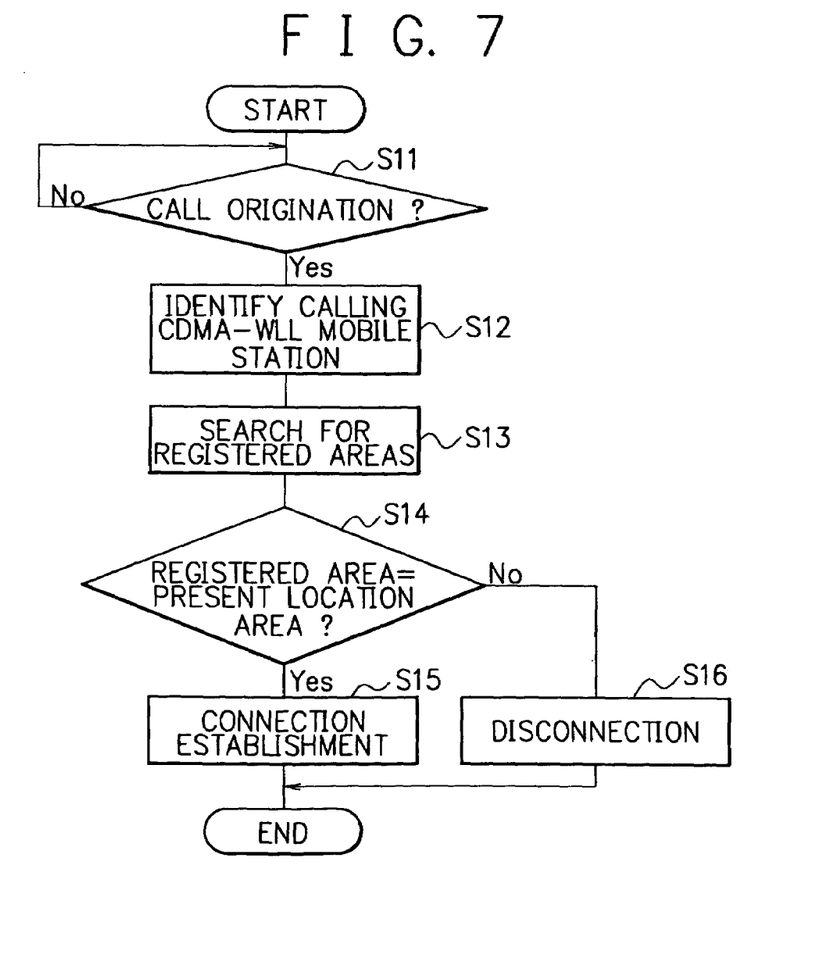
FIG. 7 is a flow chart showing an example of call connection control which is executed by a mobile services switching center of the mobile radio communication system of FIG. 3.

FIG. 7 is a flow chart showing an example of call connection control which is executed by the mobile services switching center 44. Location information concerning each mobile station (CDMA mobile station 47, CDMA-WLL mobile station 32, etc.) whose power has been turned on is gathered periodically. The location information is gathered also when the power of each mobile station (CDMA mobile station 47, CDMA-WLL mobile station 32, etc.) is turned on. Therefore, the mobile radio communication system of this embodiment keeps track of the present locations of the mobile stations shown in FIG. 5, in the same way as ordinary mobile radio communication systems.

Referring to FIG. 7, when a CDMA-WLL mobile station 32 ($32_1$, $32_2$ or $32_3$) originated a call ("Yes" in step S11), a base transceiver station corresponding to the tracked present location of the CDMA-WLL mobile station 32 receives a signal from the calling CDMA-WLL mobile station 32, and a mobile services switching center 44 that is in charge of the base transceiver station identifies the calling CDMA-WLL mobile station 32 (step S12). Subsequently, the mobile services switching center 44 refers to the CDMA-WLL controller 45 and searches for the registered areas of the CDMA-WLL mobile station 32 (step S13), and judges whether or not a match occurred between the present location areas of the CDMA-WLL mobile station 32 (one or more coverage areas in which the CDMA-WLL mobile station 32 is currently located (detected)) and the registered areas of the CDMA-WLL mobile station 32, that is, whether or not one of the present location areas at least matched one of the registered areas (step S14). If matched ("Yes" in the step S14), the mobile services switching center 44 judges that the CDMA-WLL mobile station 32 originated the call from one of its own registered areas, and thus goes to a connection establishment process (step S15).

If none of the present location areas matched any of the registered areas ("No" in the step S14), the mobile services switching center 44 judges that the CDMA-WLL mobile station 32 originated the call from outside its own registered areas, and thus goes to a disconnection (control channel disconnection) process for disabling the call origination (step S16). It is also possible to make an announcement (voice message etc.) before the disconnection in order to inform the user of the CDMA-WLL mobile station 32 about the call origination out of the registered areas.

Figure 8:
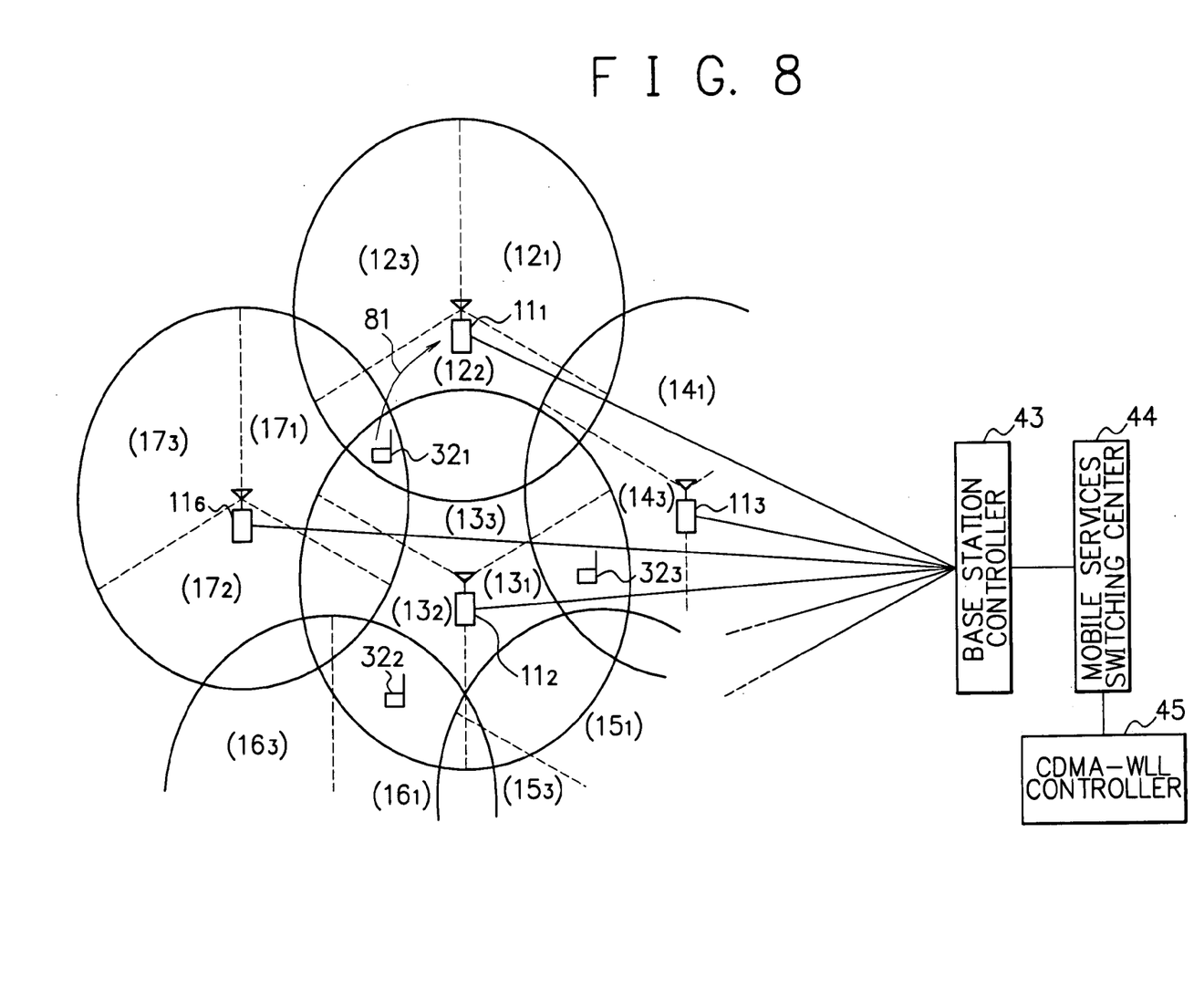
FIG. 8 is a schematic diagram showing a transmission path of a radio signal when a CDMA-WLL mobile station originated a call from its registered areas.

FIG. 8 is a schematic diagram showing a transmission path of a radio signal when the CDMA-WLL mobile station 32, originated a call from where it should be located (that is, in its registered areas). The first base transceiver station $11_1$ corresponding to the tracked present location of the CDMA-WLL mobile station $32_1$ receives a radio signal from the CDMA-WLL mobile station $32_1$ via a path 81. The mobile services switching center 44 ascertains that the tracked present location of the CDMA-WLL mobile station $32_1$ corresponds to one of the registered areas of the CDMA-WLL mobile station $32_1$ ("Yes" in the step S14), and thus goes to the connection establishment process by use of the registered coverage area $12_2$ (step S15).

Figure 9:
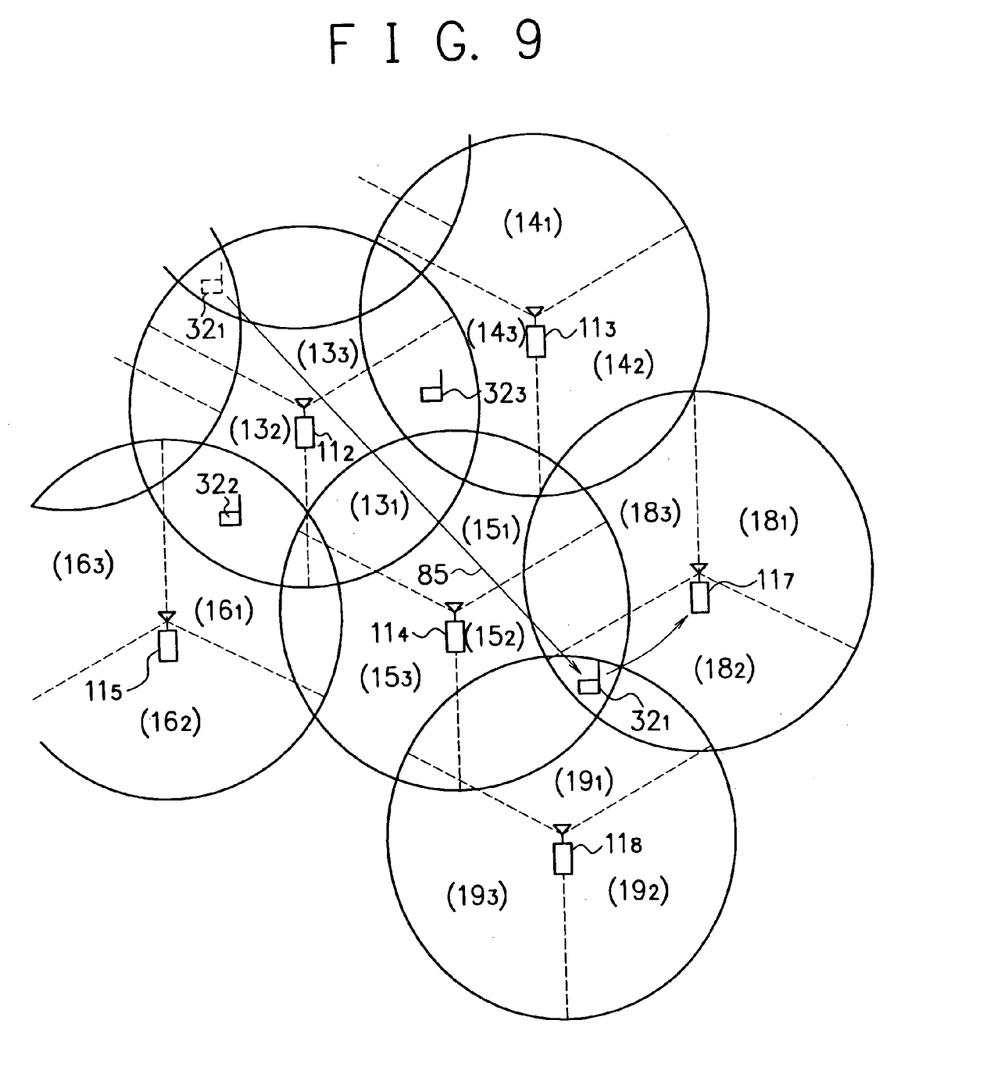
FIG. 9 is a schematic diagram showing a transmission path of a radio signal when the CDMA-WLL mobile station originated a call from outside its registered areas.

FIG. 9 is a schematic diagram showing a transmission path of a radio signal when the CDMA-WLL mobile station $32_1$ originated a call from outside its registered areas. For example, the CDMA-WLL mobile station $32_1$ is assumed to be carried by the user in a car and moved from the location of FIG. 8 to another coverage area $18_2$ along the arrow 85 shown in FIG. 9. Even though the CDMA-WLL mobile station $32_1$ is fundamentally a mobile station capable of conducting communication when carried around freely, if the CDMA-WLL mobile station $32_1$ moves out of its registered areas (see FIG. 6) ("No" in the step S14), the mobile services switching center 44 goes to the disconnection process for disabling the call origination (step S16).

Incidentally, when an ordinary CDMA mobile station 47 other than the CDMA-WLL mobile stations 32 originated a call, the mobile services switching center 44 of course goes to the connection establishment process. To sum up, when the CDMA-WLL mobile station 32 (CDMA-WLL mobile station $32_1$ etc.) which is supposed to be used in the limited and fixed registered areas moved out of the registered areas, call origination by the CDMA-WLL mobile station 32 from the place is prohibited.

Figure 10:
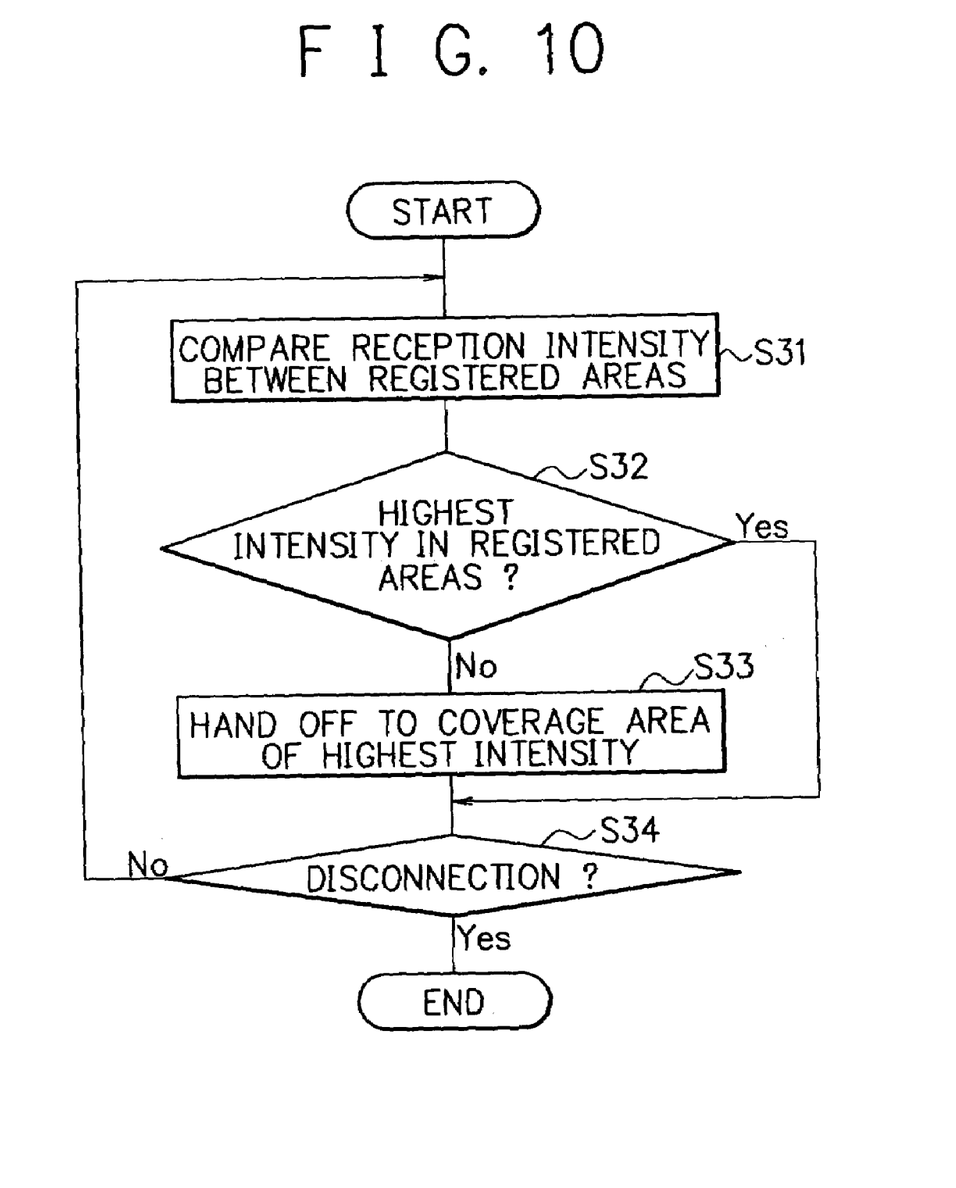
FIG. 10 is a flow chart showing an example of handoff control which is conducted in the mobile radio communication system for the CDMA-WLL mobile station during communication.

FIG. 10 is a flow chart showing an example of handoff control which is conducted in the mobile radio communication system for the CDMA-WLL mobile station 32 during conversation (communication). The CDMA mobile station 47 usually receives the same signals which are transmitted by two or more nearby base transceiver stations and controlled by the signal. The base station controller 43 (or the mobile services switching center 44) conducts the reception of a signal transmitted by the CDMA mobile station 47 in two or more coverage areas simultaneously (by use of one or more base transceiver stations), and changes the selected coverage area (that is, a coverage area that has currently been selected and used for the communication) to another coverage area having the highest reception intensity (handoff control) in order to ensure the stability and reliability of the communication. It is preferable that the handoff control should also be allowed and executed for the CDMA-WLL mobile stations 32 within the limitation of the registered areas, since the transmission/reception characteristics of the CDMA-WLL mobile station 32 in the selected coverage area might deteriorate due to variations in environmental conditions after the connection establishment.

Therefore, in the mobile radio communication system of this embodiment, the base station controller 43 (or the mobile services switching center 44) periodically compares reception intensity between the registered areas of the CDMA-WLL mobile station 32 (hereafter assumed to be the CDMA-WLL mobile station $32_1$) during conversation (communication) at predetermined periods or at the appropriate times (step S31), and judges whether or not the reception intensity of the currently-selected coverage area is the highest in the registered areas of the CDMA-WLL mobile station $32_1$ (step S32). If the reception intensity of the currently-selected coverage area is the highest ("Yes" in the step S32), the process is returned to the step S31 and the same comparison/judgment is repeated unless a disconnection process is executed ("No" in step S34).

On the other hand, if the reception intensity of the currently-selected coverage area is not the highest in the registered areas of the CDMA-WLL mobile station $32_1$ ("No" in the step S32), the handoff is executed and the selected coverage area is changed to another registered area of the CDMA-WLL mobile station $32_1$ having the highest reception intensity (step S33). Incidentally, even if reception intensity of a coverage area other than the registered areas of the CDMA-WLL mobile station $32_1$ became the highest, handoff to the highest-intensity coverage area is not executed. Therefore, if the CDMA-WLL mobile station $32_1$ moved out of its registered areas ($12_2$, $13_3$, $17_1$ and $13_2$) as shown in FIG. 9, the handoff is not executed, differently from the case of the ordinary CDMA mobile station 47 in which the handoff is successively executed according to the movement of the ordinary CDMA mobile station 47. Concretely, when the CDMA-WLL mobile station $32_1$ moved out of the registered areas and the reception intensity of the highest-intensity registered area dropped below a threshold level, the connection is disconnected.

Figure 11:
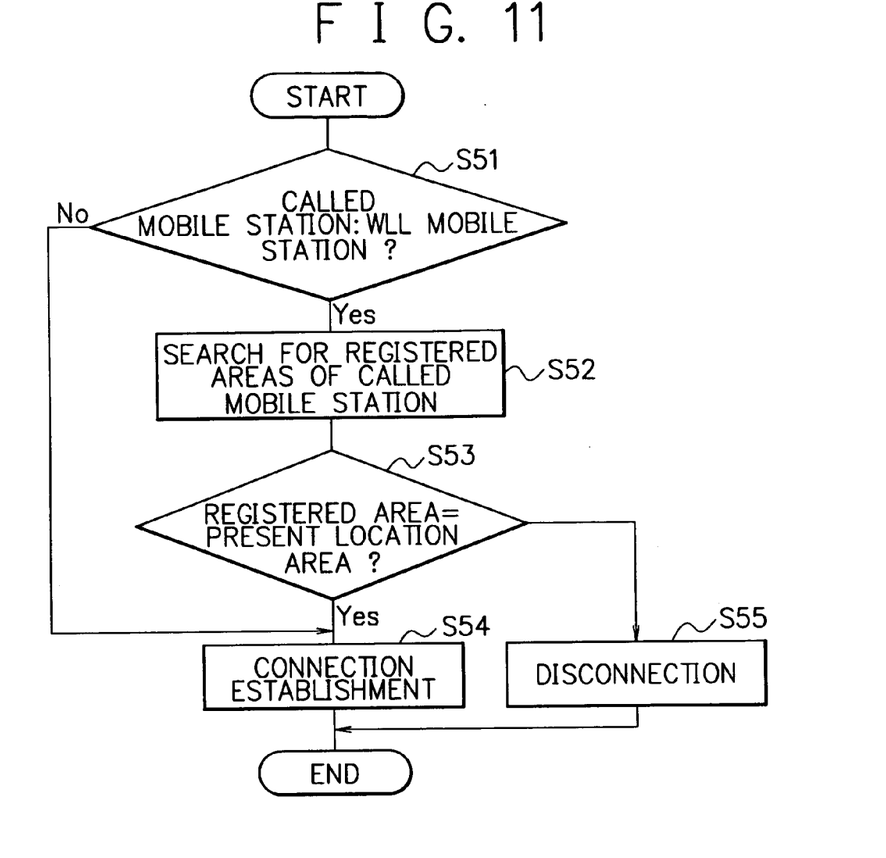
FIG. 11 is a flow chart showing an example of call connection control which is executed by the mobile services switching center when an incoming call to the CDMA-WLL mobile station occurred.

FIG. 11 is a flow chart showing an example of call connection control which is executed by the mobile services switching center 44 when an incoming call to the CDMA-WLL mobile station 32 occurred. The location information of each mobile station (CDMA mobile station 47, CDMA-WLL mobile station 32, etc.) whose power has been turned on is gathered periodically and the mobile radio communication system of this embodiment keeps track of the present location areas of the mobile stations, as mentioned before. The present location area information of a mobile station (CDMA mobile station 47, CDMA-WLL mobile station 32, etc.) is generally stored in a CDMA-WLL controller 45 (or an HLR (Home Location Register)) which is in charge of the mobile station. In this embodiment, a mobile services switching center 44 which got an incoming call to a CDMA-WLL mobile station 32 refers to the CDMA-WLL controller 45 and obtains the present location area information and the registered area information of the CDMA-WLL mobile station 32, compares the present location areas with the registered areas, and executes the connection establishment process if a match occurred in the comparison.

When a mobile services switching center 44 got an incoming call to a mobile station, the mobile services switching center 44 first judges whether or not the called mobile station is a CDMA-WLL mobile station 32 (step S51). If the called mobile station is not a CDMA-WLL mobile station 32 ("No" in the step S51), the mobile services switching center 44 executes the connection establishment process (step S54). If the called mobile station is a CDMA-WLL mobile station 32 ("Yes" in the step S51), the mobile services switching center 44 refers to the CDMA-WLL controller 45 and searches for the registered areas of the CDMA-WLL mobile station 32 (step S52) and judges whether or not a match occurred between the present location areas of the CDMA-WLL mobile station 32 and the registered areas of the CDMA-WLL mobile station 32 (that is, whether or not one of the present location areas at least matched one of the registered areas) (step S53). If matched ("Yes" in the step S53), the mobile services switching center 44 judges that the CDMA-WLL mobile station 32 is located in its own registered areas, and thus goes to the connection establishment process (step S54). If none of the present location areas matched any of the registered areas ("No" in the step S53), the mobile services switching center 44 goes to the disconnection (control channel disconnection) process for disabling the incoming call to the CDMA-WLL mobile station 32 (step S55). It is also possible to make an announcement (voice message etc.) before the disconnection in order to inform the calling party about the location of the CDMA-WLL mobile station 32 out of the registered areas.

While the mobile services switching center 44 which got the incoming call to the CDMA-WLL mobile station 32 compared the present location areas of the CDMA-WLL mobile station 32 with the registered areas of the CDMA-WLL mobile station 32 in the above operation shown in FIG. 11, it is also possible to let a mobile services switching center 44 conduct paging of the CDMA-WLL mobile station 32 in its registered areas by use of one or more base transceiver stations corresponding to the registered areas. In this example, the connection establishment process for the CDMA-WLL mobile station 32 is executed if the CDMA-WLL mobile station 32 made a response to the paging.

The above paging of the CDMA-WLL mobile station 32 can also be conducted more widely (in all coverage areas under a base station controller 43, for example). In this example, the comparison between the present location areas and the registered areas is executed if the CDMA-WLL mobile station 32 made a response to the paging, therefore, the connection establishment process for the CDMA-WLL mobile station 32 is executed if the CDMA-WLL mobile station 32 made a response to the paging from its registered areas. Also by such examples, the same effects as those of the operation shown in FIG. 11 can be attained.

In the embodiment which has been explained above, the CDMA-WLL mobile station 32 was assumed to be used in a limited and fixed area, and for ensuring the stability and reliability of communication, one or more registered areas were registered with the CDMA-WLL controller 45 and the CDMA-WLL mobile station 32 was allowed to execute communication in the registered areas, and thereby the balance between the CDMA-WLL mobile stations 32 and the ordinary CDMA mobile stations 47 and the balance between the CDMA-WLL mobile stations 32 and the ordinary fixed (wired) telephone sets were maintained appropriately.

However, there is no need to keep forever the limitation of the registered areas. Some exceptions may be allowed. In the case of internet providers, when a user or subscriber travels abroad, usable access points can be increased in predetermined areas of foreign countries when an extra charge is paid by the user. Similarly, it is also possible to increase or extend the registered areas of the CDMA-WLL mobile station 32 with some limitations when an extra charge is paid by the user. The extension of the registered areas can be limited in a city in which the user lives, for example. It is also possible to alter the registered areas during some period to alternative registered areas around a business destination, a villa, etc.

Figure 12:
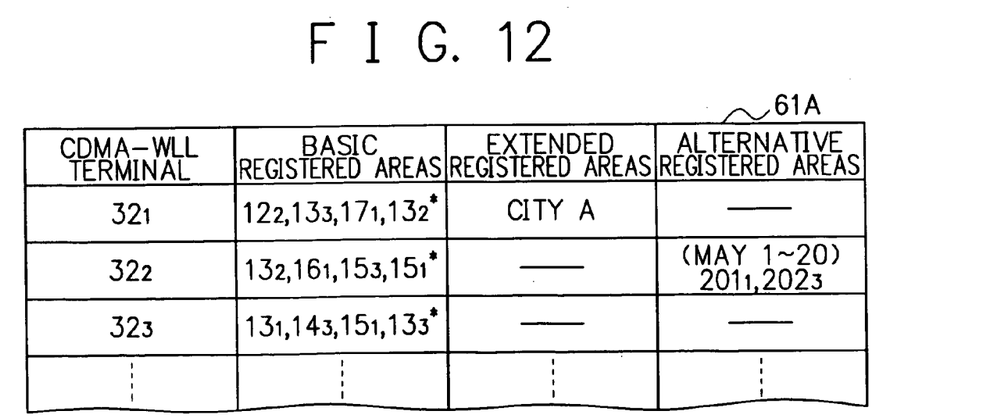
FIG. 12 is a table showing another example of the subscriber information storage area of the CDMA-WLL controller, in which information concerning extended registered areas and alternative registered areas is also stored.

FIG. 12 is a table showing another example of the subscriber information storage area, in which information concerning such extended registered areas and alternative registered areas is also stored. In the subscriber information storage area shown in FIG. 12, columns for storing "basic registered areas", "extended registered areas" and "alternative registered areas" are prepared with regard to each CDMA-WLL mobile station 32. The "basic registered areas" are the same as the registered areas which have been shown in FIG. 6. The "extended registered areas" are allowed to each user (subscriber) who made a contract for paying the extra charge. In the example shown in FIG. 12, the user of the CDMA-WLL mobile station $32_1$ is allowed to use the CDMA-WLL mobile station $32_1$ in the whole area of the "city A". A contract for the "alternative registered areas" has been made by the user (subscriber) of the CDMA-WLL mobile station $32_2$, by which the CDMA-WLL mobile station $32_2$ is allowed to be used in the alternative registered areas $201_1$ and $202_3$ (instead of the basic registered areas $13_2$, $16_1$, $15_3$ and $15_1$) during the period between May 1 and May 20.

While the above explanation has been given taking the CDMA mobile stations and the CDMA-WLL mobile stations, the present invention can widely be applied to various types of mobile radio communication systems in which location-limited mobile stations (mobile stations which are supposed to be used in limited and fixed areas) are used and limitations are put on the call origination and the call reception (reception of incoming calls) depending on areas.

While the mobile services switching center 44 in the above embodiment was connected to the CDMA-WLL controller 45 which is provided away from the mobile services switching center 44, it is also possible to provide the CDMA-WLL controller 45 to each mobile services switching center 44. In such cases, it is possible to implement the functions of the CDMA-WLL controller-integrated mobile services switching center 44 by use of a record medium storing a program for instructing a machine, a computer unit, etc. to execute the mobile radio communication method which has been described above.

As set forth hereinabove, in the mobile radio communication system and the mobile radio communication method in accordance with the embodiment of the present invention, the use of a location-limited mobile station is functionally restricted within the registered areas which are set and registered with regard to each location-limited mobile station. Therefore, the use (call origination, call reception and/or communication (handoff)) of the location-limited mobile station outside the registered areas can be prohibited almost perfectly and thereby the balance between the location-limited mobile stations and the ordinary fixed (wired) telephone sets can be maintained appropriately. The installation of the location-limited mobile stations can be completed quickly and with low cost, without the need of wiring by use of cables such as copper wires and optical fibers. By the location limitation by use of the registered areas, the location-limited mobile stations having such advantages can properly be employed and introduced to network systems by telecommunications carriers without destroying the balance with the fixed telephone sets.

Further, by the location limitation by use of the registered areas, the location-limited mobile stations can clearly be differentiated from the ordinary (location-unlimited) mobile stations in terms of functions, and thereby coexistence of the two types of mobile stations is made possible. For a user or subscriber who has made a contract for the use of a location-limited mobile station and who has not made a contract for the use of an ordinary mobile station, the use of the location-limited mobile station out of its registered areas is functionally rejected, and thereby violation of the contract can be eliminated almost perfectly. Therefore, communications equipment of each type (fixed telephone set, ordinary mobile station, location-limited mobile station) can establish its own territory and character of service.

In addition, in the case of the location-limited mobile stations which are used basically in fixed coverage areas (registered areas), usage frequency of each coverage area by the location-limited mobile stations can clearly be figured out by monitoring each coverage area. By use of such traffic data, design of future plans (subdivision of coverage areas, addition of base transceiver stations, etc.) of network systems can be conducted easily and appropriately.

In the case where the subscriber information storage area of the CDMA-WLL controller 45 is designed so that the registered areas of each location-limited mobile station can be altered (extended registered areas) so as to change the total area of the registered areas, a price schedule depending on the total area of the registered areas can be set, therefore, a price schedule having improved flexibility and rationality can be provided to the users in comparison with the conventional case where there are only two types (location-limited and location-unlimited).

In the case where the subscriber information storage area of the CDMA-WLL controller 45 is designed so that the registered areas of each location-limited mobile station can be altered to alternative registered areas during a preset period, the use of the location-limited mobile station around a business destination, a villa, etc. can be allowed within a limitation (when an extra charge is paid by the user, for example), thereby flexibility of the use of the location-limited mobile stations can be increased without destroying the balance with the ordinary mobile stations.

While the present invention has been described with reference to the particular illustrative embodiments, it is not to be restricted by those embodiments but only by the appended claims. It is to be appreciated that those skilled in the art can change or modify the embodiments without departing from the scope and spirit of the present invention.

What is claimed is:

1. A mobile radio communication system in which location-limited mobile stations can be used, comprising:
   a registered area storage means in which information concerning registered areas, which have been registered as areas where a location-limited mobile station is allowed to originate a call, is stored with regard to each location-limited mobile station, where the registered areas of each location-limited mobile station are altered to alternative registered areas during a preset time period that is defined prior to entry into the time period;
   a registered area search means for referring to the registered area storage means and thereby searching for the registered areas of a location-limited mobile station when the location-limited mobile station originated a call;
   an area comparison means for comparing the registered areas of the location-limited mobile station searched by the registered area search means with present location areas of the location-limited mobile station and thereby judging whether or not a match occurred between the registered areas and the present location areas; and
   a connection establishment means for executing a connection establishment process for the location-limited mobile station if a match occurred in the judgment by the area comparison means.

2. A mobile radio communication system as claimed in claim 1, wherein the registered area storage means is designed so that the registered areas of each location-limited mobile station can be altered so as to change the total area of the registered areas.

3. A mobile radio communication method for a mobile radio communication system in which location-limited mobile stations can be used, comprising the steps of:

a preset time period defining step in which a preset time period is defined during which alternative registered areas are effective;

a registered area search step in which a registered area storage means, in which information concerning registered areas, including the alternative registered areas, which have been registered as areas where a location-limited mobile station is allowed to originate a call is stored with regard to each location-limited mobile station, is referred to and thereby the registered areas of a location-limited mobile station is searched for when the location-limited mobile station originated a call;

an area altering step in which the registered areas of each location-limited mobile station are altered to the alternative registered areas during the preset time period;

an area comparison step in which the registered areas of the location-limited mobile station searched in the registered area search step, including the alternative registration areas only during the preset time period, are compared with present location areas of the location-limited mobile station and thereby whether or not a match occurred between the registered areas and the present location areas is judged; and a connection establishment step in which a connection establishment process is executed for the location-limited mobile station if a match occurred in the area comparison step.

4. A mobile radio communication method as claimed in claim 3, wherein the registered areas of each location-limited mobile station are allowed to be altered so as to change the total area of the registered areas.

5. A machine-readable record medium storing a program for instructing a machine, a computer unit, etc. to execute a mobile radio communication method for a mobile radio communication system in which location-limited mobile stations can be used, wherein the mobile radio communication method comprises the steps of:

a preset time period defining step in which a preset time period is defined during which alternative registered areas are effective;

a registered area search step in which a registered area storage means, in which information concerning registered areas, including the alternative registered areas, which have been registered as areas where a location-limited mobile station is allowed to originate a call is stored with regard to each location-limited mobile station, is referred to and thereby the registered areas of a location-limited mobile station is searched for when the location-limited mobile station originated a call;

an area altering step in which the registered areas of each location-limited mobile station are altered to the alternative registered areas during the preset time period;

an area comparison step in which the registered areas of the location-limited mobile station searched in the registered area search step, including the alternative registration areas only during the present time period, are compared with present location areas of the location-limited mobile station and thereby whether or not a match occurred between the registered areas and the present location areas is judged; and a connection establishment step in which a connection establishment process is executed for the location-limited mobile station if a match occurred in the area comparison step.

6. A machine-readable record medium as claimed in claim 5, wherein the registered areas of each location-limited mobile station are allowed to be altered so as to change the total area of the registered areas.

* * * * *